April 1, 1924.

P. J. JOECKEN 1,488,680

MACHINE FOR MAKING CHAPLETS AND THE LIKE

Filed April 14, 1921  3 Sheets-Sheet 1

Inventor
Peter J. Joecken
By Day, Oberlin & Day
Attorneys

April 1, 1924.

P. J. JOECKEN 1,488,680

MACHINE FOR MAKING CHAPLETS AND THE LIKE

Filed April 14, 1921     3 Sheets-Sheet 2

Inventor
Peter J. Joecken.
By Day, Oberlin & Day
Attorneys

April 1, 1924. 1,488,680
P. J. JOECKEN
MACHINE FOR MAKING CHAPLETS AND THE LIKE
Filed April 14, 1921 3 Sheets-Sheet 3

Inventor
Peter J. Joecken
By Day, Oberlin & Day
Attorneys.

Patented Apr. 1, 1924.

1,488,680

UNITED STATES PATENT OFFICE.

PETER J. JOECKEN, OF CLEVELAND, OHIO.

MACHINE FOR MAKING CHAPLETS AND THE LIKE.

Application filed April 14, 1921. Serial No. 461,457.

*To all whom it may concern:*

Be it known that I, PETER J. JOECKEN, a citizen of the United States, and a resident of Cleveland, county of Cuyahoga, and State of Ohio, have invented a new and useful Improvement in Machines for Making Chaplets and the like, of which the following is a specification, the principle of the invention being herein explained and the best mode in which I have contemplated applying that principle, so as to distinguish it from other inventions.

The present invention relates to machines for making chaplets and more particularly to the mechanism employed for cutting off the strip and for rolling and forming the articles and then delivering the same. Of particular importance is the device for preliminarily bending or forming the strip so that it may be rolled about the stick without disengaging. Other features are the means for the removal and changing of the sticks so that chaplets of any desired size may be made on the machine. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1:
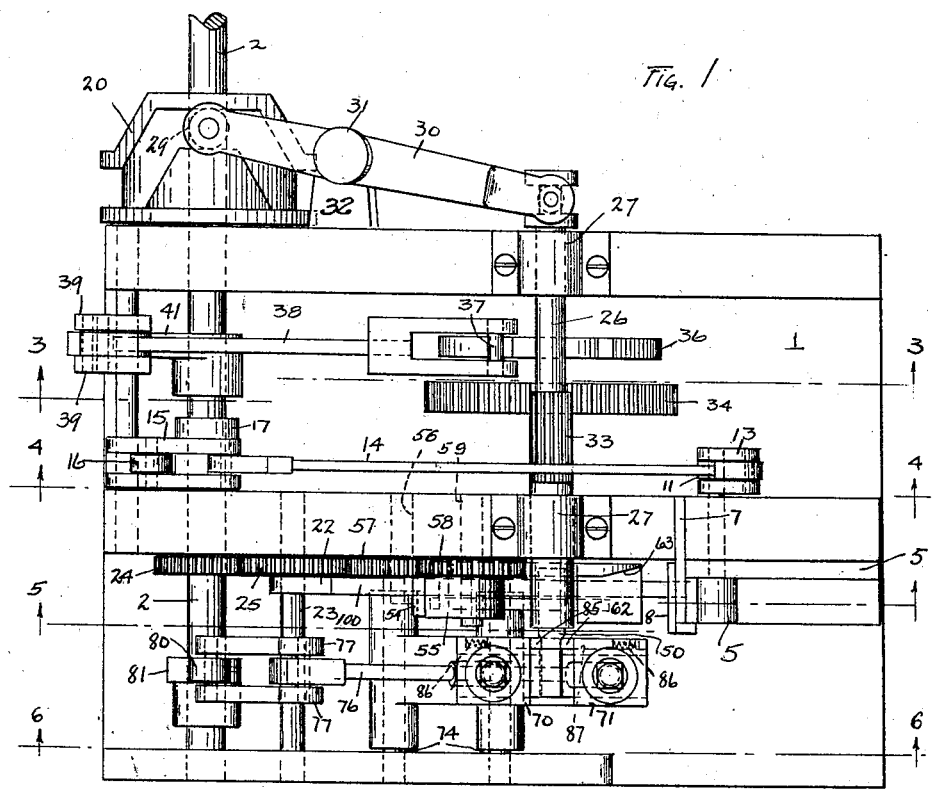
Figure 2:
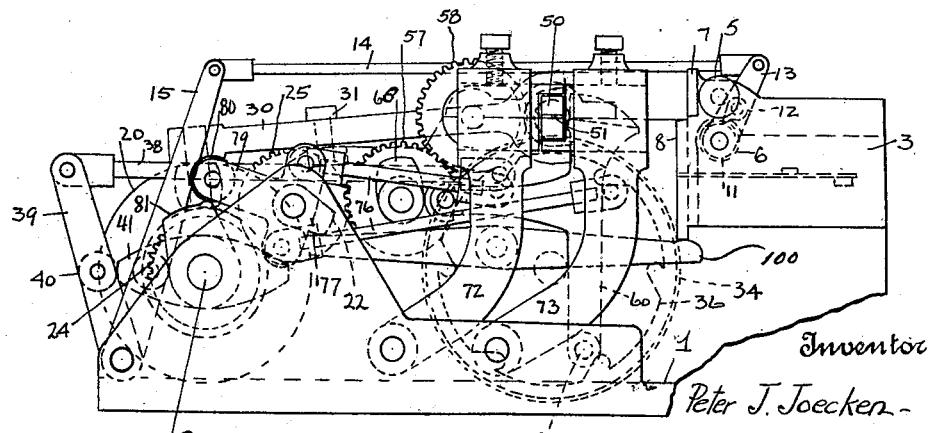
Figure 3:
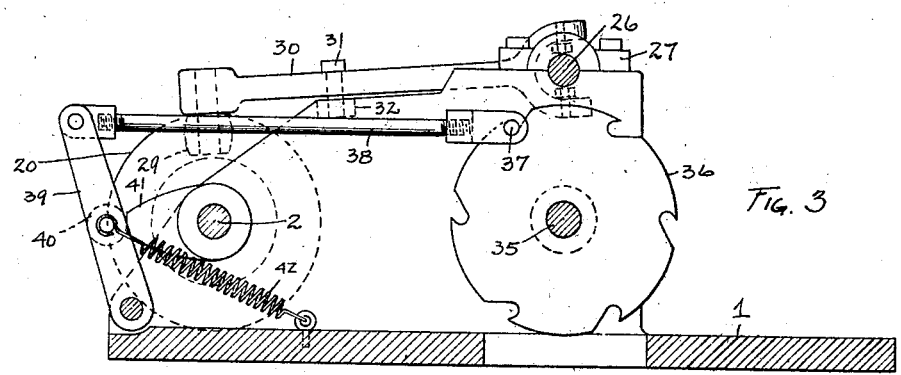
Figure 4:
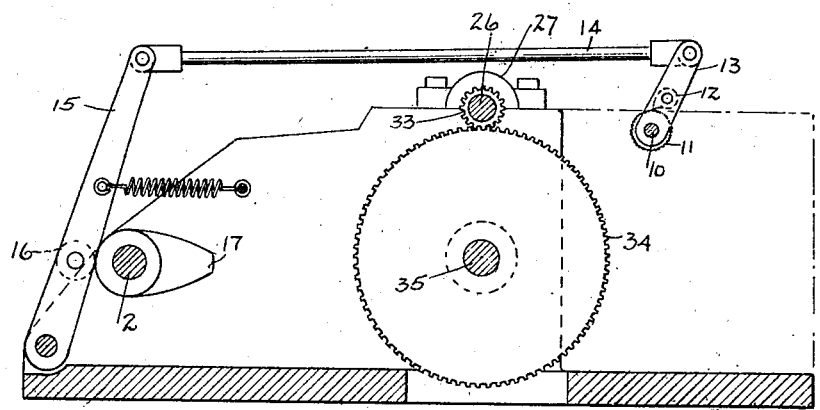
Figure 5:
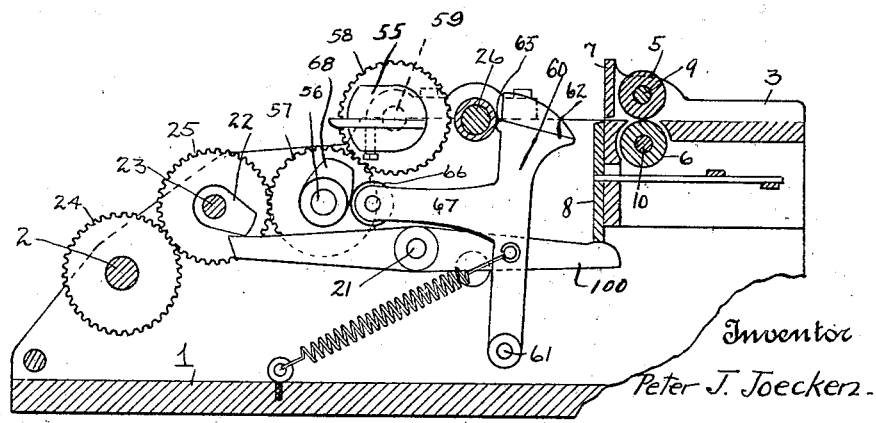
Figure 6:
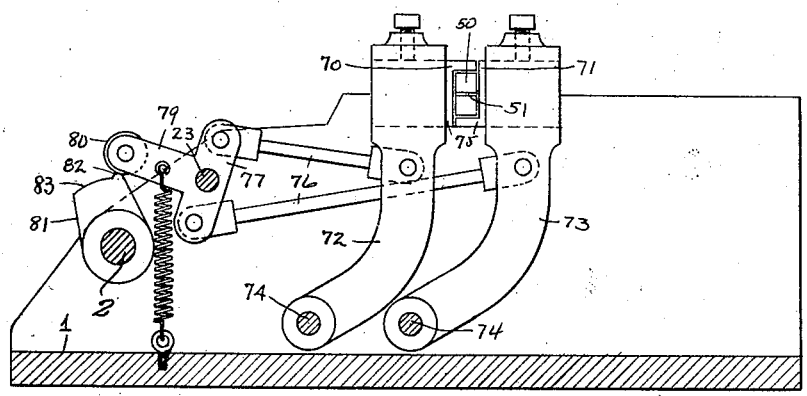
Figure 7:
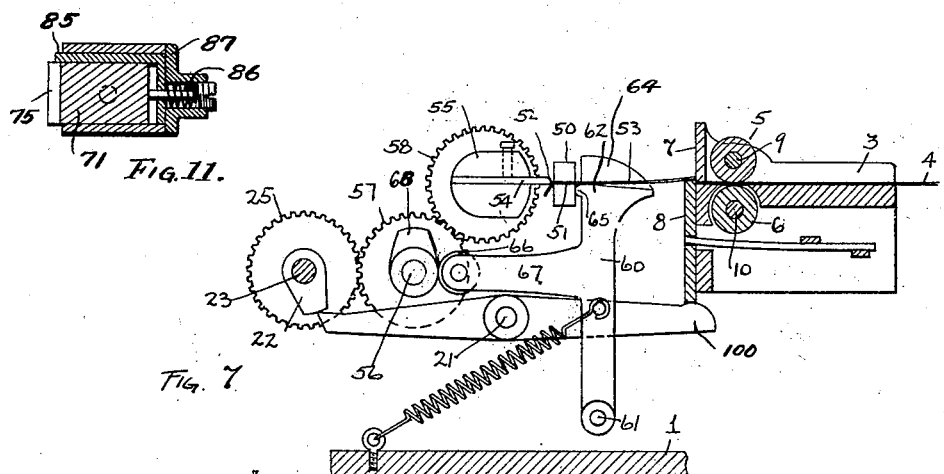
Figures 8, 9, 10:
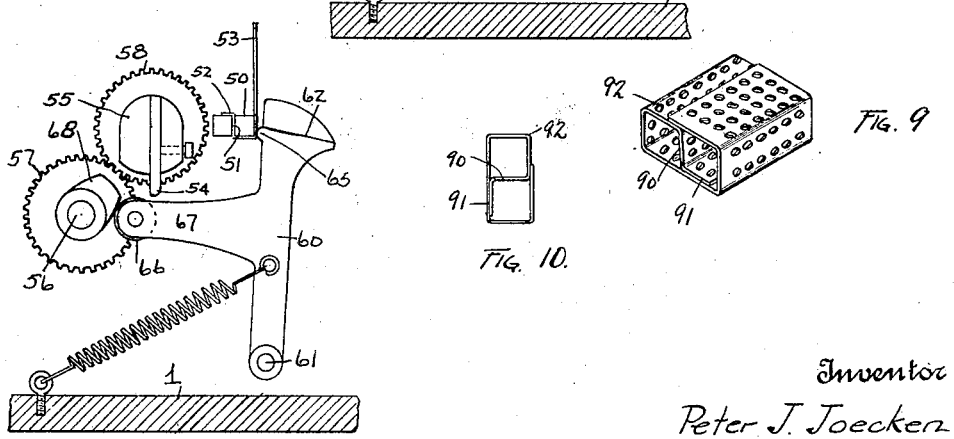

Fig. 1 is a top plan view of the machine showing the general arrangement; Fig. 2 is a side elevational view; Fig. 3 is a sectional view on the line 3—3 of Fig. 1; Fig. 4 is a sectional view on the line 4—4 of Fig. 1; Fig. 5 is a similar section on the line 5—5 of Fig. 1; Fig. 6 is a section on the line 6—6 of Fig. 1 to show the forming or clamping jaws; Fig. 7 is a section through the feeding mechanism and stick to show the device to form the preliminary bend; Fig. 8 is a section similar to Fig. 7 but showing the rolling operation partially completed; Fig. 9 is a perspective view of a finished chaplet; Fig. 10 is an end view of a chaplet, and Fig. 11 is a detailed sectional view taken through one of the forming jaws.

The present machine comprises a suitable base 1 upon which is mounted the operating mechanism. In suitable bearings in the base is mounted a power shaft 2 which will be suitably driven by a motor or other power means. On this base is mounted a feed table 3 on which the strip of material 4 is laid, the table being provided with two feed rolls 5 and 6 which are adapted to be intermittently actuated to feed the strip forward between a shear blade 7 and the table where the strip will be severed by the movable shear blade 8.

The feed rolls are mounted on shafts 9 and 10 carried in brackets or bearings from the table and the lower roll is intermittently actuated, the shaft 10 carrying this roll being extended and having a ratchet wheel 11 adapted to be engaged by a pawl 12 carried on an arm 13 which is attached to a link 14 extending lengthwise of the machine and having pivotal connection with a pivotally mounted arm 15. This arm is provided with a roller 16 adapted to be contacted and moved by a cam 17 mounted on the driving shaft 2 of the machine. The shear blade 8 is actuated by a pivoted lever 100 carried by a pin 21 on the base and adapted to be rocked by means of a cam 22 mounted on a second shaft 23 in the base, the second shaft being driven from the shaft 2 by means of gears 24 and 25 on the two shafts.

In front of the shear blades is mounted the forming mechanism, a rotatable shaft 26 being mounted in a bearing 27 in the base, the shaft being adapted to have movement transversely of the machine through the bearings and this movement is controlled by cam wheels 20 mounted on the driving shaft 2 outside of the machine base, the groove between the wheels receiving the roller 29 on one end of a pivotally mounted arm 30, the arm being carried on a pin 31 mounted on a lug or ear 32 on the base. This arm at its other end is provided with a roller engaging between two rolls or wheels on the shaft 26 so that movement of the arm is adapted to move the shaft through the bearings.

The shaft 26 is rotated by means of a pawl and ratchet connection so that intermittent rotation is secured. To accomplish this rotation the shaft is provided with a wide faced gear 33 which is in mesh at all times with a gear 34 carried on a shaft 35 journaled in the machine base. This shaft 35 is provided with a notched wheel 36, the notches being adapted to be engaged by means of a pin 37 carried by a link 38 which is connected at its other end with one end of a pivotally mounted arm 39 which is provided with a roller 40 for contact with a cam 41 mounted on the driving shaft 2. The arm 39 is provided with a spring 42 to normally move the link and pin into their forward or engaging position and the gears 33 and 34 are so proportioned as to give the correct amount of rotation to the shaft 26 through movement of the notched wheel.

When a strip has been fed through the rolls and sheared it is passed into the operating mechanism and an operating cycle may be said to commence. In the end of the shaft 26 is removably mounted a stick 50 on which the chaplet is to be formed, the stick being a rectangular block of correct size and having a central slot 51 through which the end 52 of the severed strip 53 is fed. As this end passes through the stick into the position shown in Fig. 7, it is contacted and bent downwardly by means of a former blade 54 mounted in a holder 55 carried on a rotatable shaft 59 suitably journaled in the frame. This shaft is driven through the gear train comprising the gears 24 and 25 and the gears 57 and 58 mounted on shafts 56 and 59 respectively.

The severed strip 53 is then rolled by rotation of the stick and shaft 26 and during the beginning of the rolling operation, the bent end is maintained against the stick by further movement of the blade 54. This strip 53 is fed through a pivotal guide and forming member 60 which is pivotally mounted on the frame as at 61 and is provided with a broad head portion 62 which has a curved side 63 and an adjustable guide 64. On its forward face the head has a bulge 65 which tends to force the strip around and against the stick. This former is spring pressed against the stick and strip 53 but is moved away therefrom as the stick rolls by means of a cam 68 mounted on the shaft 56 which contacts with a roller 66 carried in the end of an arm 67 on the member 60, thus allowing the former to clear the stick.

As soon as the strip has been rolled so as to roughly form the chaplet, the shaft 26 is moved transversely, thus moving the stick and chaplet over between two forming blocks 70 and 71, which are carried on two curved arms 72 and 73 pivotally mounted on pins or studs 74 in the base of the machine. In the faces of the blocks are removably mounted the forming jaws 75 which are of course changed for the different sizes of chaplets and which are adapted to fit and squeeze the chaplet tightly to form it into its final form. The two jaws are actuated towards each other by means of the links 76 which are connected to opposite ends of a double toggle member 77 which is loosely mounted on the shaft 23. This toggle member has an extending arm 79 carrying a roller 80 adapted to be engaged and actuated by means of a cam 81 mounted on shaft 2.

The cam 81 has a lug or projection 82 which engages the roller to force the jaws tightly together and the jaws then loosen slightly as the roller rides down on to the cam face 83. While the roller rides this cam face 83, the shaft 26 carrying the stick is retracted to its normal position during which backward movement the chaplet is maintained in position between the jaws. The jaws then open fully as the roller rides on the face 83 and the finished chaplet drops into a chute which carries it to a box or receptacle.

To hold the chaplet in place between the jaws during the retraction of the shaft and stick, the forming blocks 70 and 71 are provided with movable side pieces 85 which slide in grooves formed in the sides of the blocks and which are normally pressed toward each other by springs 86 carried in housings 87 on the blocks. When the jaws come together the side pieces are forced back against the action of the springs but as soon as the jaws are released, the pieces move forward against the stick and behind the edge of the finished chaplet and thus hold the chaplet against movement with the stick as the latter is withdrawn.

As shown in the last two figures, the chaplets are made of thin metal, and are formed into rectangular hollow blocks with a central cross member 90. The rebent end 91 is the portion first formed and this maintains the strip in the stick as it starts to roll thus preventing accidental removal during the rolling operation. The chaplets as shown have their corners 92 rounded or angled but this is merely a question of the jaw form. Preferably the chaplets are made of a perforated tinned sheet-metal but the form of perforations and the thickness of the metal will be varied as found necessary.

The whole machine will of course be driven from the single power shaft and the various operations so timed as to follow each other in their correct order, this being merely a question of positioning the cams and arranging the necessary gear ratios. The machine is small and takes up comparatively little room and is easy to operate, it being necessary only to feed the strips of material to the feed rolls and to provide receptacles for the finished chaplets. The machine may readily be adjusted for various sizes of chaplets, the stick and jaws being readily removable from the shaft and the blocks respectively.

In rolling the chaplets it is necessary to hold the strips in the stick so that they will roll and not merely come out of the slot; as the strips must not be tightly fixed in the slot the rebending of the end of the strip against the stick in the opposite direction to the winding is essential and it is this rebent end which allows the machine to be continuously operated without dropping strips or jamming, and it also allows the chaplets to be readily removed from the stick.

The machine is continuous in operation, the strip being fed in and sheared off as soon as the stick has been moved back ready for a new operation and the chaplets are delivered to any suitable receptacle without any handling. As soon as a strip is used up another is inserted and fed to the rolls and thus the operation may be continued until a sufficient number have been made or until a change in size is desired.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a machine for making chaplets, the combination of a revoluble slotted stick, means for moving a severed strip of metal through such slot, means for bending the end of said strip against one side of said stick, and other means for turning said stick to wind said strip thereon, said bending means holding said strip against displacement during the beginning of such winding movement.

2. In a machine for making chaplets the combination of a revolvable slotted stick, means for moving a severed strip of metal through said stick, means for bending the end of the strip against one side of said stick and other means for turning said stick to wind said strip thereon starting to wind on the side of said stick opposite to said bend.

3. In a machine for making chaplets and the like the combination of a revolvable slotted stick, means for moving a severed strip through said stick, means for bending the end of the strip, other means for turning said stick to wind said strip thereon, and means for stripping the finished chaplet from said stick.

4. In a machine for making chaplets and the like the combination of a base, a stick holder rotatably mounted therein, a stick mounted in said holder, means for feeding material to said stick, means for bending the extending end of such material against said stick in a direction opposite to the rotation of said stick, and other means for rotating said stick to wind such material to form the chaplet.

5. In a machine for making chaplets and the like the combination of a base, a stick holder rotatably mounted therein, a slotted stick mounted in said holder, means for cutting off material and feeding the same through such slot in said stick, means for bending the end of such material against said stick, other means for rotating said stick in a direction opposite to the pre-bent end to wind said material about the same to form the chaplet, and means for removing said chaplet from said stick.

6. In a machine for making chaplets and the like the combination of a base, a stick holder rotatably mounted therein, a slotted stick mounted in said holder, means for cutting off material and feeding the same through such slot in said stick, means for bending the end of such material against said stick, other means for rotating said stick in a direction opposite to the pre-bent end to wind said material about the same to form the chaplet, means for squeezing said wound material on said stick to form said chaplet, and means for removing said chaplet from said stick.

7. In a machine for making chaplets and the like the combination of a base, a stick holder rotatably mounted therein, a slotted stick mounted in said holder, means for cutting off material and feeding the same through such slot in said stick, means for bending the end of such material against said stick, other means for rotating said stick in a direction opposite to the pre-bent end to wind said material about the same to form the chaplet, forming jaws adapted to force together about such chaplet and stick to form said chaplet, and means for removing said chaplet from said stick and jaws.

8. In a machine for making chaplets and the like the combination of a base, a stick holder rotatably mounted in said base and capable of longitudinal movement, a slotted stick mounted in said holder, cutting and feeding mechanism mounted on said base and adapted to feed severed strips through such slot in said stick, means mounted on said base to bend the extending end of the strip against said stick, means for rotating said stick and holder to roll the strip about the same, forming jaws mounted on said base, means for moving said stick and holder longitudinally to bring the rolled strip between said jaws, means for clamping said jaws together to form the chaplet on said stick, and means for removing said chaplet from said stick upon return longitudinal movement of said stick.

9. In a machine for making chaplets and the like the combination of a base, a stick holder rotatably mounted in said base and capable of longitudinal movement, a slotted stick mounted in said holder, cutting and feeding mechanism mounted on said base and adapted to feed severed strips through such slot in said stick, means mounted on said base to bend the extending end of the strip against said stick, means for rotating said stick and holder to roll the strip about the same, said bending means being adapted to hold said bent end against said stick during the first part of the rotation to prevent the strip from working loose from said stick, forming jaws mounted on said base and adapted to receive said stick and rolled strip to form the chaplet, means for moving said holder and stick between said jaws, means for clamping said jaws together, and other means for removing said formed chaplet from said stick upon return longitudinal movement of the latter.

10. In a machine for making chaplets and the like the combination of a base, a power shaft rotatably mounted therein, a stick holder rotatably mounted in said base and adapted to have longitudinal movement, means for intermittently rotating said holder from said power shaft, a slotted stick removably mounted in said holder, cutting off and feeding mechanism mounted on said base and adapted to sever strips of material and to feed the same one at a time to said stick, the strip passing through the slot and extending slightly beyond the stick, means for operating said cutting off and feeding mechanism from said power shaft, a bending blade movably mounted in said base and adapted to bend the extending end of the strip against said stick and to hold the same during the first part of rotation of said stick, forming jaws mounted in said base and adapted to receive said stick and rolled strip to form the chaplet, drawing means operable from said power shaft for moving said jaws together on said stick, and means operable from said power shaft to remove the chaplet from said stick, said operating and drawing means being timed to operate in a cycle to cut and feed said strip to bend and roll the same, and then to form and remove the chaplet.

11. In a machine for forming a chaplet the combination of a base, a stick holder rotatably mounted therein, a stick removably attached to said holder and provided with a slot, means for feeding a strip of material through such slot and extending slightly beyond said stick, means for bending such extending end of said strip to secure the same against pulling out and means for revolving said holder and stick to roll such strip around said stick in a direction opposite to the bend of the extending end.

12. In a machine for forming a chaplet the combination of a base, a stick holder rotatably mounted therein, a stick removably attached to said holder and provided with a slot, means for feeding a strip of material through such slot and extending slightly beyond said stick, a blade movably mounted in said base and adapted to engage such extending end of the strip to bend the same against said stick, and means for rotating said stick to roll said strip about the same in a direction opposite to the bent end, said blade remaining in contact with said bent end during the first part of such rolling movement to prevent withdrawal of the strip from such slot during the rolling movement.

13. In a machine for forming a chaplet the combination of a base, a stick holder rotatably mounted therein, a stick removably attached to said holder and provided with a slot, means for feeding a strip of material through such slot and extending slightly beyond said stick, a blade movably mounted in said base and adapted to engage such extending end of the strip to bend the same against said stick, and means for rotating said stick to roll said strip about the same in a direction opposite to the bent end, said blade remaining in contact with said bent end during the first part of such rolling movement to prevent withdrawal of the strip from such slot during the rolling movement and means on said base for holding said stick during the rolling operation to make the strip wind about the stick.

Signed by me, this 8th day of April, 1921.

PETER J. JOECKEN.